United States Patent Office 3,586,684
Patented June 22, 1971

3,586,684
DIQUINOLONOPYRIDONE
Chung C. Chen, Belleville, N.J., assignor to E. I. du Pont de Nemours and Company, Wilmington, Del.
No Drawing. Filed Oct. 11, 1967, Ser. No. 674,635
Int. Cl. C07d 33/50
U.S. Cl. 260—288       6 Claims

ABSTRACT OF THE DISCLOSURE

A class of compounds of which diquinolonopyridone is illustrative, and new and useful pigments formed therefrom along with a class of intermediates of which dimethyl-3,5-dianilinochelidamate is typical.

BACKGROUND OF THE INVENTION

The present invention provides a novel and useful organic compound of the formula:

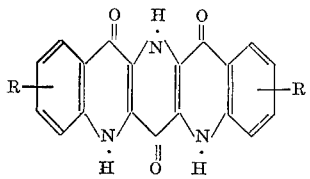

(I)

wherein R is the same, or different member of the class consisting of lower alkyl, lower alkoxy, and halogen as replacement for hydrogen in any of the four positions of each benzenoid ring. Such a compound may be conveniently formed by ring closure of a compound of the formula:

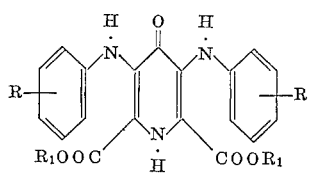

(II)

wherein $R_1$ is a member of the class consisting of hydrogen and lower alkyl.

Compound (II) is prepared by a Jordan-Ullmann condensation of a dihalochelidamic acid or its lower alkyl ester with an aromatic amine of the formula

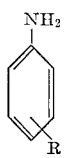

(III)

wherein R, as defined above, may replace as many as four hydrogens attached to ring carbon, with the proviso that at least one ring carbon ortho to the amino nitrogen substituent is unsubstituted. Compound (II) is converted to (I) by ring closure in the presence of cyclizing agent such as polyphosphoric acid (PPA). Preparation of the pigmentary form involves purification of the crude and reduction to the desired particle size, these steps being those commonly used in pigment technology. They include such methods of particle size reduction as acid pasting, acid swelling, salt milling, salt-solvent milling, solvent breaching, etc., all of which methods have been widely used in the technology of such popular pigments as phthalocyanines and quinacridones. The other steps related to purification of the product entail such common procedures as recrystallization, washing, filtration, etc., all of which will be illustrated in the detailed examples to follow.

For a clearer understanding of the invention, the following specific examples are given. These examples are intended to be merely illustrative of the invention and not in limitation thereof. Unless otherwise specified, all percentages and parts are by weight.

Example 1

Dibromochelidamic acid is prepared by adding 320 parts of bromine at a uniform rate over a 3¼ hour period to a suspension of 183 parts of chelidamic acid in 750 parts of water at room temperature. The temperature rises from 21° to 37° C. and the mixture is heated to 75° C. in 1½ hours. It is thereafter cooled to room temperature and filtered. The semi-dry product recrystallized from 2000 parts of water and dried at 80° C. is recovered in a yield of 84.8% of theory. It has a melting point above 300° C.

The diester of dibromochelidamic acid is prepared by bubbling hydrogen chloride gas into a mixture of 50 parts of the above acid in 200 parts of methanol for 5 minutes. The solution is refluxed for 3 hours, following which 1 part of declorizing charcoal is added. After an additional stirring of 5–10 minutes, the solution is filtered hot, the filtrate is distilled and, after recovery of 125 parts of methanol, cooled. The product precipitates as a colorless solid which is recovered by filtration and washed free of acid with water to provide a yield of 88.6% of theory.

A small sample recrystallized from methanol has a melting point of 112–113° C. (softening at 102° C.).

To prepare a compound corresponding to Formula II above wherein $R_1$ is hydrogen and there is no R substituent, (i.e. 3,5-dianilinochelidamic acid), 113.5 parts of dimethyl 3,5-dibromochelidamate, prepared as described immediately above, is stirred and refluxed for 10 hours in a reaction vessel along with:

|   | Parts |
|---|---|
| Ethylene glycol | 330 |
| Potassium carbonate | 90 |
| Water | 75 |
| Aniline | 450 |
| Potassium iodide | 15 |
| Cupric acetate monohydrate | 3 |

The mixture is then steam distilled to remove the major portion of unreacted aniline, the solution is concentrated to about 1000 parts, cooled to room temperature and filtered to remove a small amount of a colorless precipitate. The filtrate is acidified with concentrated hydrochloric acid to a pH of 2 or less whereupon a yellow product precipitates which is isolated by filtration and washed with water. (Yield: 37.0 parts) When 3,5-dibromodichelidamic acid is substituted in equivalent amount for the ester, a similar product is obtained, the identity of the two being demonstarted by their infrared absorption spectra.

Diquinolonopyridone (corresponding to Formula I above wherein there is no R substituent) is prepared by heating a stirred mixture of 123.3 parts of pulverized 3,5-dianilinochelidamic acid with 1,233 parts of PPA over a period of 1 to 1½ hours to 140–150° C. The mixture is maintained at temperature for 3½ to 4 hours. It is then cooled to room temperature, and water is added slowly, the rate being such as to maintain the temperature below 60° C. The precipitated product is isolated by filtration, washed free of acid, and dried at 80° C. The crude product obtained is extracted with boiling dimethyl formamide (DMF), filtered hot, and washed successively with DMF and alcohol. A yield of 101 parts of the product is obtained.

To prepare a pigment of diquinolonopyridone, 37 parts of the dimethylformamide (DMF) extracted crude is pulverized and dissolved in 370 parts of concentrated sulfuric acid at 8–10° C. The acid concentration is lowered to 75% by the gradual addition of water with stirring, the rate being such as to maintain the temperature at first below 10° C. but at the end of the dilution to permit the temperature to rise to 25° C. The precipitated sulfate of diquinolonopyridone is separated by filtration and then hydrolyzed to the free diquinolonopyridone by treatment with ice and water. The red product is isolated by filtration, washing free of acid and drying. Yield: 23.3 parts.

The acid crystallization is repeated, and the product extracted twice with 1000 parts of boiling DMF. Final yield: 14.2 parts.

The product isolated from the acid crystallization or DMF extraction shows an X-ray pattern which indicates that it is isomorphous with the beta modification of quinacridone (cf. U.S. 2,844,485). A similar crystal structure is realized when the product is reduced in particle size by salt milling and then followed by refluxing with DMF, acetic acid, alcohol, xylene or water. Likewise, decomposition of the sodium salt of diquinolonopyridone in acetic acid at room temperature yields the same crystal form. The X-ray data, showing the interplanar spacings in angstrom units, are summarized in the following table and compared with those of the beta crystal form of linear quinacridone:

| Diquinolonopyridone, A.: | Beta quinacridone, A. |
| --- | --- |
| 15.22 | 15.23 |
| 7.49 | 7.55 |
| 5.50 | 5.47 |
| 4.90 | |
| 4.11 | 4.06 |
| 3.81 | |
| 3.31 | 3.31 |

An entirely different crystal form of diquinolonopyridone is obtained when the product is subjected to the following procedure. One part of the acid recrystallized, DMF extracted product is suspended in 50 parts of ethanol and 5 parts of 50% aqueous sodium hydroxide. The mixture is refluxed for 2½ hours, following which it is filtered hot. The isolated blue sodium salt is suspended in water, whereupon some color change to red occurs; but complete hydrolysis is not achieved until the product is acidified with concentrated hydrochloric acid. An orange product is isolated by filtration, washing and drying. The X-ray diffraction pattern of this product shows interplanar spacings at 14.24, 6.60, 5.53, 3.64, and 3.32 angstrom units. This pattern shows some similarity to that of alpha-phase linear quinacridone (U.S. 2,844,484) and some to gamma-phase quinacridone (U.S. 2,844,581) and may conceivably be a mixture of two crystal forms which are isomorphous with the aforementioned phases of linear quinacridone.

The acid pasted diquinolonopyridone is flushed into a linseed oil vehicle and compared to a corresponding ink prepared from a typical gamma-phase linear quinacridone. Though somewhat duller in masstone, it shows a strength advantage over the linear quinacridone, the strength of the diquinolonopyridone being as high as twice that of the reference standard, depending upon the conditions of test. The strength advantage is also observable when the pigment is dispersed in various paint vehicles, the advantage being dependent on the system in which the pigments are tested. When very bright red finishes, approximating the masstone depth and color of Toluidine Red are prepared by pigmenting with a blend of diquinolonopyridone and Molybdate Orange, such finishes are fully as attractive as their counterparts pigmented with a blend of beta-phase linear quinacridone and Molybdate Orange. Furthermore, the higher quantity of the less expensive Molybdate Orange used in the blend with the diquinolonopyridone results in increased hiding over the corresponding blends with linear quinacridone. It is thus obvious that the inherent strength advantage demonstrated in the simple comparison of the diquinolonopyridone with linear quinacridone is carried through into the blends with the inorganic pigment.

Six months' exposure of paint panels in Florida show that diquinolonopyridone has very good durability in a thermosetting acrylic enamel and is also quite good in an acrylic lacquer system. The pigment shows no bleed in these or other paint systems in which it is tested.

Example 2

To prepare a compound corresponding to Formula II above wherein $R_1$ is hydrogen and R is p-methyl (i.e., 3,5-di-para-toluidinochelidamic acid), 113.5 parts of dimethyl 3,5-dibromochelidamate is stirred and refluxed for 10 hours in a reaction vessel along with 330 parts ethylene glycol, 90 parts potassium carbonate, 75 parts water, 531 parts p-toluidine, 15 parts potassium iodide and 3 parts cupric acetate monohydrate. The mixture is diluted with 1000 parts of water and refluxing continued for another 1½ hours. It is then cooled to 20° C. and the excess precipitated p-toluidine is removed by filtration. On acidification of the filtrate with acetic acid, the free acid is precipitated as a yellow product. This is isolated by filtration, washing with water, and drying. Yield: 43.3 parts.

2,10 - dimethyldiquinolonopyridone is prepared by cyclization of 20 parts of pulverized 3,5-di-para toluidinochelidamic acid using 300 parts of PPA, following the cyclization procedure of Example 1, to provide a yield of 13.7 parts.

To prepare a pigment of 2,10-dimethyldiquinolonopyridone, 22 parts of the DMF extracted crude is pulverized and dissolved in 220 parts of concentrated sulfuric acid at 8–10° C. The acid concentration is lowered carefully to 90% by the gradual addition of water, and the precipitated sulfate is isolated by filtration. This is then hydrolyzed by treatment with ice and water and the pigment is isolated by filtering, washing acid free and drying. Yield: 13.0 parts.

The product is acid pasted and flushed into linseed oil vehicle and found to compare very closely in both color and strength with the parent unsubstituted diquinolonopyridone.

Paint tests in acrylic enamel show the product to be yellow and strong vs. a standard γ-quinacridone toner (U.S. Pat. 2,844,581). The purified product is salt milled and the powder refluxed in various solvents such as DMF, acetic acid, alcohol, xylene, and water. The crystal form most often encountered shows interplanar spacings by X-ray diffraction at 17.3, 10.5, 7.37, 6.02, 5.40, 4.72, 4.39, 3.86, 3.70, and 3.32 angstrom units. The product refluxed in xylene shows an additional peak of medium intensity at 11.94 angstrom units. The product extracted in water only shows a peak at 5.75 angstrom units, but no other significant differences. The DMF refluxed pure product is considerably yellower than its acid pasted counterpart and is quite strong.

Example 3

To prepare a compound corresponding to Formula II above wherein $R_1$ is hydrogen and R is p-chloro (i.e., 3,5-di-para-chloroanilinochelidamic acid), 91.2 parts of 3,5-dibromochelidamate is stirred and refluxed for 10 hours with 264 parts ethylene glycol, 72 parts potassium carbonate, 60 parts water, 492 parts p-chloroaniline, 12 parts potassium iodide and 2.4 parts cupric acetate monohydrate. The mixture is diluted with 800 parts of water and refluxing continued for another 1½ hours. It is then cooled to approximately 20° C. and filtered to remove the excess p-chloroaniline. The filtrate is acidified with acetic acid, wherein a yellow product precipitates. This is isolated by filtration, washing, and drying. Yield: 24.0 parts.

2,10-dichlorodiquinolonopyridone is prepared by cyclization of 45.7 parts of pulverized 3,5-di-parachloroanilinochelidamic acid using 500 parts of PPA, following the cyclization procedure of Example 1, to provide a yield of 29.5 parts.

To prepare a pigment of 2,10-dichlorodiquinolonopyridone, 22 parts of the DMF extracted crude is pulverized and dissolved in 500 parts of 100% sulfuric acid at 5–10° C. The acid concentration is lowered to 97% with water and the precipitated sulfate is isolated by filtration. It is then hydrolyzed by treatment with ice and water. The resulting pigment is isolated by filtration, washing free of acid and drying. Yield: 10.5 parts.

The product is acid pasted and flushed into a linseed oil vehicle. It was found to be strong but dull versus 2,9-dimethylquinacridone; also duller and bluer than the unsubstituted parent diquinolonopyridone.

In acrylic enamel the product is yellow and slightly slightly strong versus γ-quinacridone, and blue versus the dimethylquinolonopyridone.

Typical X-ray diffraction patterns of products finished by various ways show interplanar spacings at 16.98, 5.90, 5.27, 4.87, 4.48, 4.09, 3.77, 3.59, and 3.22 angstrom units.

Example 4

To prepare a compound corresponding to Formula II above wherein $R_1$ is hydrogen and R is para-methoxy (i.e., 3,5-di-para-anisidinochelidamic acid), 68.4 parts of dimethyl 3,5-dibromochelidamate is stirred and refluxed for 10 hours with 198 parts ethylene glycol, 54 parts potassium carobnate, 45 parts water, 37 parts p-anisidine, 9 parts potassium iodide and 1.8 parts cupric acetate monohydrate. The mixture is then diluted with 600 parts of water and refluxing continued for an additional 1½ hours. The reaction mixture is cooled to about 20° C. and the precipitated excess amine removed by filtration. Upon acidification with acetic acid, the free acid is percipitated as a dark yellow solid. This is isolated by filtration, washing free of acid, and drying. Yield: 61.1 parts.

2,10-dimethoxydiquinolonopyridone is prepared by cyclization of 62.4 parts of pulverized 3,5-di-para-anisidinochelidamic acid using 1000 parts of PPA, following the cyclization procedure of Example 1, except that the mixture is stirred and heated rapidly to 125–130° C. and maintained at this temperature for only 7 minutes, after which it is then cooled rapidly and worked up in the usual manner. A yield of 44.5 parts is obtained.

To prepare a pigment of 2,10-dimethoxydiquinolonopyridone, 20 parts of the DMF extracted crude is pulverized and dissolved in 300 parts of concentrated sulfuric acid at 8–10° C. The acid concentration is lowered to 90% by theg radual addition of water at such a rate as to maintain the temperature at 10° C. or lower initially and not above 15° C. at the end of the dilution. The precipitated sulfate is filtered and subsequently hydrolyzed by treatment with ice and water. The pigment is isolated by filtration, washing free of acid, and drying. Yield: 13.0 parts.

Comparison of the flushed acid pasted product with the unsubstituted diquinolonopyridone shows it to be fully as strong as the latter, but somewhat duller.

In acrylic enamel the product is slightly yellow and weak vs. the dimethyl counterpart.

When the product is salt milled and refluxed in various solvents, it is found that the mixture which is extracted with water gives a markedly different X-ray pattern (alpha phase) than those refluxed in DMF, acetic acid, alcohol or xylene (beta phase). The interplanar spacings derived from the X-ray diffraction patterns are shown in the following table:

| Alpha phase, A. | Beta phase, A. |
| --- | --- |
| 17.66 | 8.84 |
|  | 6.60 |
| 5.98 | 6.23 |
| 5.40 | 4.37 |
|  | 4.09 |
| 3.78 | 3.75 |
|  | 3.42 |
| 3.30 | 3.16 |

Example 5

To prepare a compound corresponding to Formula II above wherein $R_1$ is hydrogen and R is m-methyl (i.e., 3,5-di-meta-toluidinochelidamic acid), 75.9 parts of dimethyl 3,5-dibromochelidamate is stirred and refluxed for 10 hours with 220 parts ethylene glycol, 60 parts potassium carbanate, 50 parts water, 177 parts m-toluidine, 10 parts potassium iodide and 2 parts cupric acetate monohydrate. The reaction mixture is steam distilled to remove the excess m-toluidine, and the volume concentrated to about 500 parts. It is then cooled and filered to remove the small amount of insoluble material which forms. The filtrate is acidified with acetic and the small amount of precipitate formed removed by filtration. Then the filtrate is acidified with concentrated hydrochloric acid to a pH of 1 or less, whereupon a bright yellow precipitate is formed. This is isolated by filtration, washing free of acid, and drying. Yield: 20.3 parts.

3,9-dimethyliquinolonopyridone is prepared by cyclization of 72.0 parts of pulverized 3,5-di-meta-toluidinochelidamic acid using 800 parts of PPA following the cyclization procedure of Example 1 to provide a yield of 61.7 parts.

To prepare a pigment of 3,9-dimethyldiquinolonopyridone, 24.6 parts of the DMF extracted crude is pulverized and dissolved in 492 parts of 97.5% sulfuric acid at a temperature below 10° C. The concentration of acid is lowered to 70% by the careful addition of water. The precipitated sulfate is filtered and subsequently hydrolyzed by treatment with ice and water. The resulting precipitated pigment is isolated by filtration, washing free of acid, and drying. Yield: 8.3 parts.

The X-ray diffraction pattern of the DMF extracted product is different from that of the acid recrystallized counterpart, indicating the existence of at least two crystal phases.

MODIFICATIONS AND EQUIVALENTS

Although the specific examples are restricted to dibromochelidamic acid as the initial starting material, nevertheless other halogenated derivatives such as the iodinated or chlorinated counterparts may be used. The actual choice will be determined largely by considerations of cost as well as the ability of the intermediate to undergo satisfactorily the subsequent Jordan-Ullmann condensation with the particular aromatic amine. The choice of aromatic amine is not intended to be restricted to those actually shown in the examples, but may include other primary aromatic amines, such as substitution products of aniline, amines, etc. It is necessary, of course, that one of the positions in the aromatic ring ortho to the primary amino group be unsubstituted so as to permit the subsequent cyclization.

A large number of satisfactory cyclizing agents will be suggested to those familiar with related art, such as the synthesis of quinacridone. Among these may be mentioned acids, such as sulfuric, chlorsulfonic, hydrofluoric, boric; acid anhydrides, such as phosphorus pentoxide, phthalic anhydride;

acid halides, such as benzoyl chloride, benzoyl bromide, phosgene, benzotrichloride, thionyl chloride, phosphorus pentachloride, phosphorus oxychloride;
acid salts, such as anhydrous aluminum chloride, titanium chloride, sodium acid sulfate;
sulfonated alkyl or aromatic compounds, and heat per se.

The cyclization may optionally be conducted in an inert solvent diluent, such as trichlorobenzene, nitrobenzene, "Dowtherm" A (a eutectic mixture of biphenyl and diphenyl ether), etc.

The conditions for the synthesis and ultimate processing of the products may be varied as required by the particular compound desired.

ADVANTAGES OF THE INVENTION

This invention provides red pigments which possess high strength. In other properties, such as freedom from bleed in paint systems, insolubility in solvents, resistance to chemical agents, lightfastness, freedom from migration in plastic systems, etc., they compare favorably with the best red pigments currently known. They may be blended with inorganic pigments, such as Molybdate Orange, to obtain attractive, bright red shades, which show good lightfastness, resistance to discoloration at elevated temperatures, and bleed resistance—all of which properties are very important in intense red finishes. The strength of these pigments permits the use of a minimum of the relatively expensive organic component in such blends along with the inorganic, such as Molybdate Orange.

These pigments may be used in all applications where colored pigments are employed. Such applications include printing ink, paint, paper, coating, plastics, rubber, mass pigmentation of synthetics, etc. The usual well known methods of conditioning the surface of pigments for adaptation to particular systems are applicable.

What is claimed is:
1. The compound

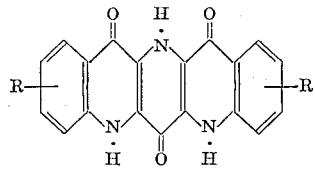

wherein R is a member of the class consisting of lower alkyl, lower alkoxy and halogen and, when present, is replacement for hydrogen in any of the four positions of each benzenoid ring.

2. The compound of claim 1 wherein R is methyl in the 2,10 positions.

3. The compound of claim 1 wherein R is methyl in the 3,9 positions.

4. The compound of claim 1 wherein R is chloro in the 2,10 positions.

5. The compound of claim 1 wherein R is methoxy in the 2,10 positions.

6. The compound of claim 1 wherein no R substituent is present.

References Cited

UNITED STATES PATENTS

| | | | |
|---|---|---|---|
| 3,107,248 | 10/1963 | Cooper | 260—279 |
| 3,124,581 | 3/1964 | Bottler | 260—279 |
| 3,334,102 | 8/1967 | Aldridge | 260—288 |
| 3,372,184 | 3/1968 | Auster | 260—471 |

DONALD G. DAUS, Primary Examiner

U.S. Cl. X.R.

106—288; 260—279, 295, 578